May 29, 1962
B. G. KERR
3,037,165
ELECTRICAL INDICATING MEASURING OR CONTROL
APPARATUS AND THE LIKE
Filed June 2, 1958
2 Sheets-Sheet 1
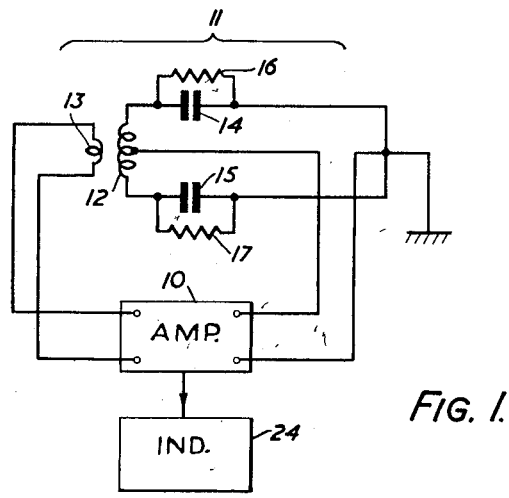
FIG. 1.
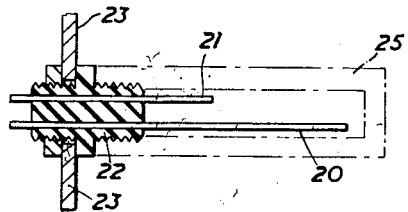 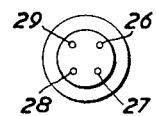
FIG. 2.   FIG. 3.
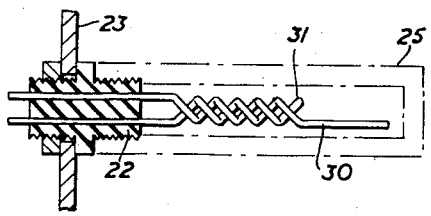
FIG. 4.
INVENTOR
BRUCE GORING KERR
BY
ATTORNEYS United States Patent Office 3,037,165
Patented May 29, 1962

3,037,165
ELECTRICAL INDICATING MEASURING OR CONTROL APPARATUS AND THE LIKE
Bruce Goring Kerr, Amersham, England, assignor to Goring Kerr Limited, Gerrards Cross, England
Filed June 2, 1958, Ser. No. 739,084
Claims priority, application Great Britain May 30, 1957
2 Claims. (Cl. 324—61)

This invention relates to electrical indicating, measuring or control apparatus of the type which responds to changes in value of an impedance element, and especially a capacitative element.

The invention has for its object to provide an improved apparatus of this type, and the invention consists broadly of an electrical indicating, measuring or control apparatus, and comprising a probe assembly presenting at least two electrical impedances the values of which are adapted to change effectively in response to both an unwanted change of a physical quantity and to a wanted change of a physical quantity, an electrical impedance network including said impedances, the attenuation of said network varying differently with said wanted and unwanted changes, and indicating measuring or control means operating in accordance with the attenuation of said network.

The invention also includes an electrical indicating, measuring or control apparatus and comprising a probe assembly presenting at least two impedances the values of which are adapted to change effectively in response to both an unwanted change of a physical quantity and a wanted change of a physical quantity, a signal transmission device including said impedances, the transmission characteristic of said device being altered in opposite senses for said wanted and unwanted changes and indicating, measuring or control means responding to the transmission characteristic of said device.

These and other featuers and advantages of the invention will appear from the following description of embodiments thereof, in conjunction with the accompanying drawings in which:

FIGURE 1 is a diagram, partly block schematic, of a simple arrangement;

FIGURE 2 is a diagram showing a probe assembly;

FIGURES 3 and 4 are diagrams showing alternative forms of probe assemblies.

Figure 5:
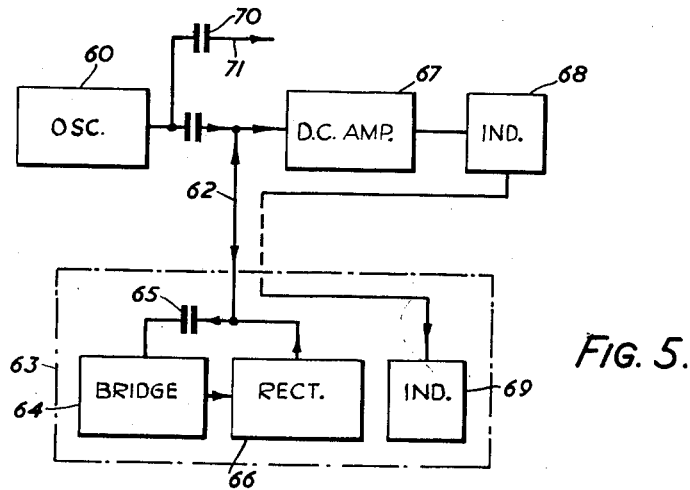

The apparatus shown in FIGURE 1 is one which responds to very small changes of capacitance; when a predetermined capacitance change occurs the apparatus responds. The response can be the actuation of a relay, but other responses are possible. The small change in capacitance to which the apparatus responds can be due to a variety of occurrences. For example, it can be the presence or proximity of an object, the approach of the level of a liquid or material in a container to a predetermined point or to a change, due to any cause of the dielectric constant of the material between test electrodes. At the same time, as will appear hereinafter, the apparatus can be made so as to be insensitive to certain other changes.

Turning to FIGURE 1, the apparatus comprises an amplifier 10, the output of which is coupled to the input over a feedback circuit which is indicated generally at 11. The feedback circuit includes a transformer having windings 12 and 13; the winding 13 is connected to the input of the amplifier, one terminal of which is earthed, and the winding 12 has a centre-tap. The output of the amplifier is connected between the centre-tap on winding 12 and earth.

Between the outer ends of winding 12 and earth are two capacitors 14, 15, and it will be seen that the feedback circuit thus presents a bridge circuit of which the four arms consist of the two parts of winding 12 and the two capacitors; input is applied to one diagonal of the bridge from amplifier 10 and output is taken from the other diagonal, by winding 13.

If the bridge is precisely balanced there will be no output, and the feedback voltage is zero. If the bridge is unbalanced in one sense, a positive feedback voltage will be produced, and if the magnitude of the unbalance is large enough the amplifier will oscillate. The magnitude of unbalance at which oscillation is initiated will depend upon the gain of the amplifier. On the other hand, if the unbalance is in the opposite sense, the feedback is negative, and no oscillation will occur even with a large degree of unbalance.

With the arrangement according to the invention the capacitances of capacitors 14, 15 are varied in accordance with the physical property in respect of which the apparatus is to respond. A probe assembly, for this purpose and suitable for use as, say, a level detector in a container for powder or like material is shown in FIGURE 2.

This probe assembly includes two rod-like insulated elements 20, 21 lying parallel to each other and, in the case of a fluid level indicator, horizontal. Element 20 is longer than element 21; the two elements are secured in an insulator 22 in a container wall 23, with an insulating cover 25. The two elements are connected in the circuit of FIGURE 1 so that one element 20 provides the unearthed electrode of capacitor 14 and element 21 the unearthed electrode of capacitor 15; the arrangement is such that an increase of capacitance of the longer electrode 20 to earth will promote oscillation, whilst an increase between shorter electrode 21 and earth will inhibit oscillation. It will be readily apparent that if the contents of the container rise sufficiently the capacity to earth of element 20 will produce oscillation, and an indicating recording or control apparatus 24 of any suitable type operated thereby.

At the same time, should any material lodge near the attached ends of the elements, there will be an increase of both capacitors 14 and 15 and the bridge will tend to remain in balance. The system is thus insensitive to stray deposit or accumulation of material on the elements, which is very desirable.

In such circumstances, the system is insensitive to changes of shunt resistance 16, 17 in parallel with capacitors 14, 15, if the resistances are equal, this is likely with the apparatus described. However, in certain conditions the system can be made to respond, in similar manner to change of resistors 16, 17 or even relative change of reactance or ratio of the two parts of winding 12.

FIGURE 3 is an end view of an alternative probe assembly; in this assembly are used one long element 26 and three short elements 27, 28, 29. Elements 26 and 28 are joined together as are 27 and 29 and are connected in the same way as elements 20, 21 above. This provides a more symmetrical arrangement, less sensitive to the location of any deposited material. More than four electrodes can be similarly connected.

Another form of electrode assembly, having the same object, is shown in FIGURE 4. In this construction the elements 30 and 31 are in the form of two interwound helices, the one, longer, element 30 having a straight part projecting at one end.

Another arrangement in accordance with the invention is shown in block schematic form in FIGURE 5. This apparatus comprises an oscillator 60 which feeds through a direct current isolating device 61 here shown as a capacitor, and a conductor 62 a head unit indicated generally by chain line 63. The head unit includes a bridge circuit 64, to which the oscillations are fed through a further isolating device 65. The bridge circuit is normally balanced; the bridge unit is similar to that described above, and responds to the physical quantity in response to changes of which the indication or control is desired.

The out of balance voltage of the bridge is rectified by rectifier 66 and the rectified current is fed back, over conductor 62, to a direct current amplifier 67. Amplifier 67 is preferably of the type having a trigger operation; it controls an indicator 68, which may control a repeater indicator 69 at the head unit 63.

Further head units can be employed by using a further isolating element 70, and connecting the head unit with its associated amplifier and indicator, over conductor 71.

Figure 6:
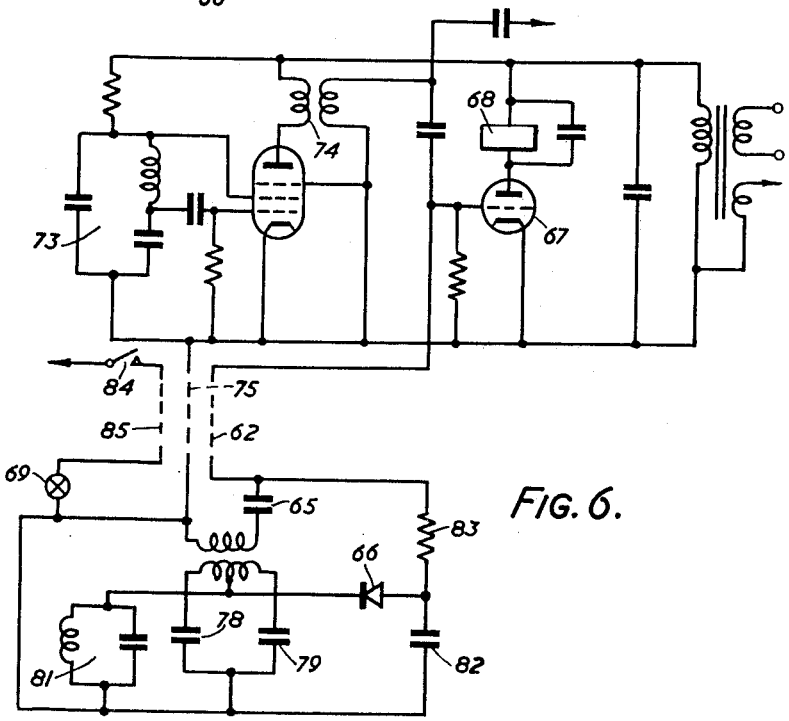

FIGURE 6 shows an arrangement similar to that of FIGURE 5 and using two head units; like references in the two figures are applied to like parts. In FIGURE 6 the oscillator comprises a valve 72 arranged as a so-called electron coupled oscillator, the oscillation frequency being determined by the resonant circuit indicated generally at 73. The operation of this circuit will be sufficiently clear not to need further description. The output is obtained from the anode circuit by transformer 74; the earthed suppressor grid of valve 72 largely isolates the output from the resonant circuit.

The output is fed over capacitor 61 to conductor 62, and a low potential conductor 75 to head unit 63. The oscillations are applied through capacitor 65 to the primary winding 76 of a transformer the secondary winding 77 of which is centre-tapped and, with capacitors 78 and 79 forms a bridge circuit. Capacitors 78 and 79 are the capacitors the capacitances of which are changed by a change of the physical quantity to which the apparatus responds.

A parallel resonant circuit 81, tuned to the oscillation frequency, is connected across the output diagonal of the bridge; when the bridge is unbalanced the voltage appearing across the tuned circuit is rectified by rectifier 66 and after smoothing by the filter 82, 83 the rectified output current is fed back over conductor 62 to the main apparatus.

The direct voltage on conductor 62 is applied to an amplifier valve 67 the anode circuit of which includes the winding of a relay 68. When there is a sufficient change of capacitance of capacitor 79, the current of valve 67 will change and can be made to operate or release the relay 68. The contacts 84 of the relay are arranged to operate and complete (or break) the circuit of an indicator lamp 69 at the head unit, over conductor 75 and a third conductor 85. The indicator lamp current flows in conductor 75 causes a small voltage drop in that conductor and thus can be used to augment the voltage change initiating the relay operation. This reduces any tendency of the relay to chatter, and makes its operation more positive. With the arrangement described it is possible to use an alternating current source for supplying the valve anode current. Other head units, each with an associated valve and relay such as 67, 68 can be used.

I claim:

1. An apparatus for supervising changes in a physical magnitude, said apparatus comprising a probe including at least two impedance elements each exhibiting an impedance to ground which is a function of the physical magnitude to be detected, said elements being disposed in spaced side-by-side relationship and having unequal physical dimensions such that one of said elements projects in part beyond the other of said elements, whereby said elements respond substantially equally to a change in said physical magnitude in a local region close to those parts of said elements remote from said projecting part of said one element, and respond differentially to a change in said physical magnitude in regions other than said local region, a bridge network including said impedance to ground in opposite arms of the network and having an input and an output, circuit means connected to said input for applying an electrical signal to said network to be attenuated in dependence upon the transmission impedance of said network as determined by said impedance to ground, and supervisory means connected to the output of said network to respond to said electrical signal.

2. An apparatus for supervising changes in a physical magnitude, said apparatus comprising a probe including at least two electrically-conductive rod-like members each exhibiting a capacitance to ground which is a function of the physical magnitude to be detected, said members being mounted at one end thereof in spaced, insulated side-by-side relationship and having unequal length so that the free end of one member projects beyond the free end of the other member, whereby said members respond substantially equally to changes in said physical magnitude occurring in a local region close to the mounted end of said members, and respond differentially to changes in said magnitude occurring in regions other than said local region, a bridge network including said capacitances to ground in opposite arms of the network, amplifier means having a feedback circuit including said bridge network for feeding positive feedback to said amplifier means in response to a bridge unbalance in one sense and negative feedback in response to a bridge unbalance in the opposite sense, and supervisory means connected to said amplifier means and controlled by the condition thereof.

References Cited in the file of this patent

UNITED STATES PATENTS

| | | |
|---|---|---|
| 1,984,166 | Walter | Dec. 11, 1934 |
| 2,025,719 | Blau et al. | Dec. 31, 1935 |
| 2,104,441 | Stratford | Jan. 4, 1938 |
| 2,230,137 | Ewertz | Jan. 28, 1941 |
| 2,251,641 | Stein | Aug. 5, 1941 |
| 2,357,023 | Reid et al. | Aug. 29, 1944 |
| 2,376,168 | Mounce | May 15, 1945 |
| 2,432,669 | Kliever | Dec. 16, 1947 |
| 2,527,208 | Berry et al. | Oct. 24, 1950 |
| 2,617,852 | Waters | Nov. 11, 1952 |
| 2,623,996 | Gray | Dec. 30, 1952 |
| 2,724,273 | Sontheimer | Nov. 22, 1955 |
| 2,774,959 | Edelman et al. | Dec. 18, 1956 |
| 2,787,710 | Van Tol | Apr. 2, 1957 |
| 2,836,808 | Walker | May 27, 1958 |